(12) United States Patent
Simpson et al.

(10) Patent No.: US 6,992,695 B1
(45) Date of Patent: Jan. 31, 2006

(54) SURVEILLANCE SYSTEM

(75) Inventors: Peter Kenyon Simpson, Red Hill (AU); Anthony Robert Flint, The Gap (AU)

(73) Assignee: Lextar Technologies, Ltd, Newmarket (AU)

( * ) Notice: Subject to any disclaimer, the term of this patent is extended or adjusted under 35 U.S.C. 154(b) by 0 days.

(21) Appl. No.: 10/009,130

(22) PCT Filed: May 8, 2000

(86) PCT No.: PCT/AU00/00422

§ 371 (c)(1),
(2), (4) Date: Nov. 5, 2001

(87) PCT Pub. No.: WO00/69177

PCT Pub. Date: Nov. 16, 2000

(30) Foreign Application Priority Data

May 6, 1999 (AU) .................................... PQ0171

(51) Int. Cl.
*H04N 7/18* (2006.01)
(52) U.S. Cl. ...................... 348/143; 348/153; 348/154
(58) Field of Classification Search ......... 348/142–160
See application file for complete search history.

(56) References Cited

U.S. PATENT DOCUMENTS

| | | | |
|---|---|---|---|
| 3,819,932 A | 6/1974 | Auer, Jr. et al. | 246/1 R |
| 4,510,526 A * | 4/1985 | Coutta et al. | 348/143 |
| 4,656,509 A | 4/1987 | Matsuyama et al. | 358/100 |
| 4,954,886 A | 9/1990 | Elberbaum | 358/86 |
| 5,018,009 A | 5/1991 | Koerv | 358/100 |
| 5,241,380 A * | 8/1993 | Benson et al. | 348/143 |
| 5,448,290 A * | 9/1995 | VanZeeland | 348/153 |
| 5,526,041 A | 6/1996 | Glatt | 348/143 |
| 6,349,653 B1 * | 2/2002 | Siedlarczyk | 104/279 |
| 6,614,468 B1 * | 9/2003 | Nordmann | 348/143 |
| 6,715,940 B2 * | 4/2004 | Top et al. | 396/427 |

FOREIGN PATENT DOCUMENTS

| | | |
|---|---|---|
| AU | B-21619/92 | 8/1993 |
| AU | 00922338.9-2223 | 7/2004 |
| DE | 197 40 761 A 1 | 3/1999 |
| FR | 2722927 | 7/1994 |
| GB | 2140185 A | 11/1984 |

* cited by examiner

*Primary Examiner*—Andy Rao
(74) *Attorney, Agent, or Firm*—Lloyd W. Sadler

(57) ABSTRACT

A surveillance system having two or more monitoring devices moving on a single track. The monitoring devices are suitably video cameras but may also include audio monitoring. Power for the monitoring devices, control signals and signals from the monitoring devices are all transmitted on the track. Power is suitably DC and other signals are suitably RF. The system incorporates collision avoidance means to prevent collision between adjacent moving cameras. The collision avoidance means includes hand-over software so that a person can seamlessly scan a region with camera control being passed to adjacent cameras to avoid collision.

38 Claims, 14 Drawing Sheets

SURVEILLANCE SYSTEM

FIELD OF THE INVENTION

The present invention relates to a track mounted multiple mobile camera surveillance system.

BACKGROUND OF THE INVENTION

Remote cameras to survey an area are known and commonly used. Attaching movable surveillance cameras to a track system to permit viewing of different locations is also known and the subject of U.S. Pat. Nos. 4,656,509 and 4,510,526. These patents describe remote controlled carriage mounted cameras for surveying an area, but do not permit multiple cameras on a single track.

A typical video surveillance system is disclosed in Australian patent 659190 and comprises a track assembly which is mounted to a room ceiling. A movable carriage is able to travel repetitively back and forth along the track and is provided with a camera to transmit video images of monitored areas to a remote location.

The carriage in AU 659190 comprises two cameras mounted to a single platform, a drive assembly, drive control and video circuit boards. The cameras are mounted to the support platform at different angles in order to observe a wide area.

The track includes two conductors of copper tubing suitably mounted and supported within semi-cylindrical grooves of an isolation block made of electrically insulating material. Each conductor is in slidable contact with at least one corresponding isolated slidable electrically conductive brush located on the underside of the carriage.

Output signals from the cameras are provided to a video modulator board on the carriage which modulates suitable carrier signals for transmission through the conductors to a demodulator connected at the end of the track. The demodulator demodulates each camera output signal from its respective carrier signal and displays the corresponding image on monitors.

Proximity sensors are located along the length of the track and these are hardwired back to a controlling interface system so that the location of the carriage is able to be monitored through the proximity sensors.

Power to the carriage is provided through the two conductors, so that the conductors carry both the power, control and video signals received from the cameras.

The above system has the drawback that it is not possible to accurately monitor more than one area at a single time because the single carriage carrying the cameras cannot be at two locations along the track simultaneously. Also, the above system requires maintenance of wearable parts such as conductive bushes which contact the conductors.

SUMMARY OF THE INVENTION

It is an object of the invention to provide an apparatus to overcome one or more of the limitations of, or improve upon, the prior art as discussed above.

These and other objects, features and advantages of the present invention will become more apparent in the light of the detailed description of exemplary embodiments thereof, as illustrated by the accompanying drawings.

In one form, the invention resides in a surveillance system comprising:
an electrical conducting track;
two or more carriages movable on the track;
a driving means mounted on each carriage for moving each carriage to different locations along the track;
a power supply providing power to each carriage;
at least one monitoring device mounted on each carriage providing an output signal for a monitored location;
a modulation means receiving the output signal;
a transmission means for transmitting modulated output signals through the track;
a means for receiving and demodulating the transmitted modulated output signals;
a viewing means to view the demodulated output signal at a remote location; and
a control means for controlling movement of each carriage on the track.

The track suitably comprises at least one conductor.

Preferably the track comprises three conductors, one transferring power, a second transferring video and control signals and a third as a ground conductor.

Each carriage comprises a data processor which includes position management software for recording the location of the carriage along the track, storing data on the location of each adjacent carriage, transmitting data relating to its position along the track to an interface translator, receiving and storing data relating to the location of each adjacent carriage from the interface translator and/or each adjacent carriage and controls movement of each carriage whereby collisions between adjacent carriages are avoided.

Another form of the invention provides a brushless means for transmitting information from a carriage to a conductor. This information includes data and/or output signals from a monitoring device, such as video, transmitted at radio frequency (RF).

Preferably, the control means includes means for avoiding collision of the carriages. A suitable means for avoiding collision comprises:
a location means to determine a location of each carriage on the track;
a means for storing the location of each carriage;
a transmission means associated with each carriage for transmitting the carriage location;
a receiving means for receiving and monitoring the locations of each carriage; and
a means for controlling the location of each carriage to avoid collision of any carriages.

Preferably, the means for avoiding collisions between adjacent carriages provides a means for transmitting and receiving carriage positional information from each carriage and the interface translator. Each carriage and interface translator is able to monitor and store the locations of each carriage.

A suitable location means is a location or position sensor means comprising registration marks or position indicators associated with the track; means on the carriages to read the registration marks; means comprising a rotatable wheel on the carriages whereby wheel rotations represents distance travelled by the carriages; means to calculate a carriage position; means associated with each carriage for transmitting the position; means for receiving the positions of each carriage; and means for controlling the position of each carriage to avoid collision of any carriages.

The interface translator is suitably adapted to receive position data from each of the carriages and stores data on the position of each carriage based on the data received from the location means.

The collision avoidance means is suitably retrofitable to known surveillance systems.

The position management software comprises a means for allocating a priority value to each carriage at a particular time, whereby a carriage allocated a higher priority is commanded by the position management software to move to a predetermined location on the track when the interface translator receives a command signal from a master controller.

The interface translator preferably comprises a microprocessor which is controlled by the position management software, memory storage for recording the position of each carriage and the minimum distance between adjacent carriages and a track receiver and transmitter for communicating data between the master controller and the microprocessor.

Because a carriage cannot physically overtake another carriage on the single track, a mechanism is provided to automatically transfer control from one carriage to a second carriage, simulating an overtaking process. The interface translator, which is monitoring the positions of all the carriage, provides a means for transferring control information from one carriage to an adjacent carriage as part of a handover process. As an example, if a first carriage is moving along the track and encounters a second carriage, the first carriage is stopped at a minimum buffer distance from the second carriage and the control commands are transferred to the second carriage. When a preset viewing location is requested, the interface translator which stores information relating to viewing locations, instructs the carriage closest to the preset viewing location, thus reducing a response time which is especially important if the preset viewing location is activated by an alarm input. If the carriages are performing tours, which are automated movements of the carriages along the track, the handover process is more complicated. When a first carriage performing a tour encounters a second carriage on the track, tour information which is stored at the interface translator is sent to the second carriage allowing the second carriage to continue the tour. Completion of the handover process occurs as the tour is executed.

The position management software of the interface translator polls each carriage at predetermined time intervals or rate to monitor the location of each carriage. The polling rate of the carriages may change according to the number of carriages on the track and the number of active or stationary carriages.

According to another form of the invention there is provided a track assembly comprising an insulative insert which engages a conductor at one surface and engages a portion of the track assembly at a second surface whereby the insulative insert function as an insulator of a conductor and a means for attaching a conductor to a track assembly.

The insulating insert may have additional insulating members attached to a surface of the insert providing a means for insulating two or more conductors. The additional insulating members are suitably located between two or more conductors. Preferably, the insulation insert contacts the conductor (s) and track assembly at positioned intervals along the track assembly; however, the insulation insert may contact the conductors and track assembly continuously.

Another form of the invention provides surveillance method including the steps of:

locating two or more carriages on a track;

mounting at least one monitoring device on each carriage;

providing power to power movement of each carriage on the track;

transmitting output signals, preferably image or image and audio signals, from the monitoring device to a remote location; and controlling movement of the carriages on the track.

Throughout this specification unless the context requires otherwise, the word "comprise", and variations such as "comprises" or "comprising", will be understood to imply the inclusion of the stated integers or group of integers or steps but not the exclusion of any other integer or group of integers.

DESCRIPTION OF THE FIGURES

Preferred embodiments of the invention will now be described by way of example only with reference to the accompanying drawings in which.

DETAILED DESCRIPTION OF THE INVENTION

Figure 1:
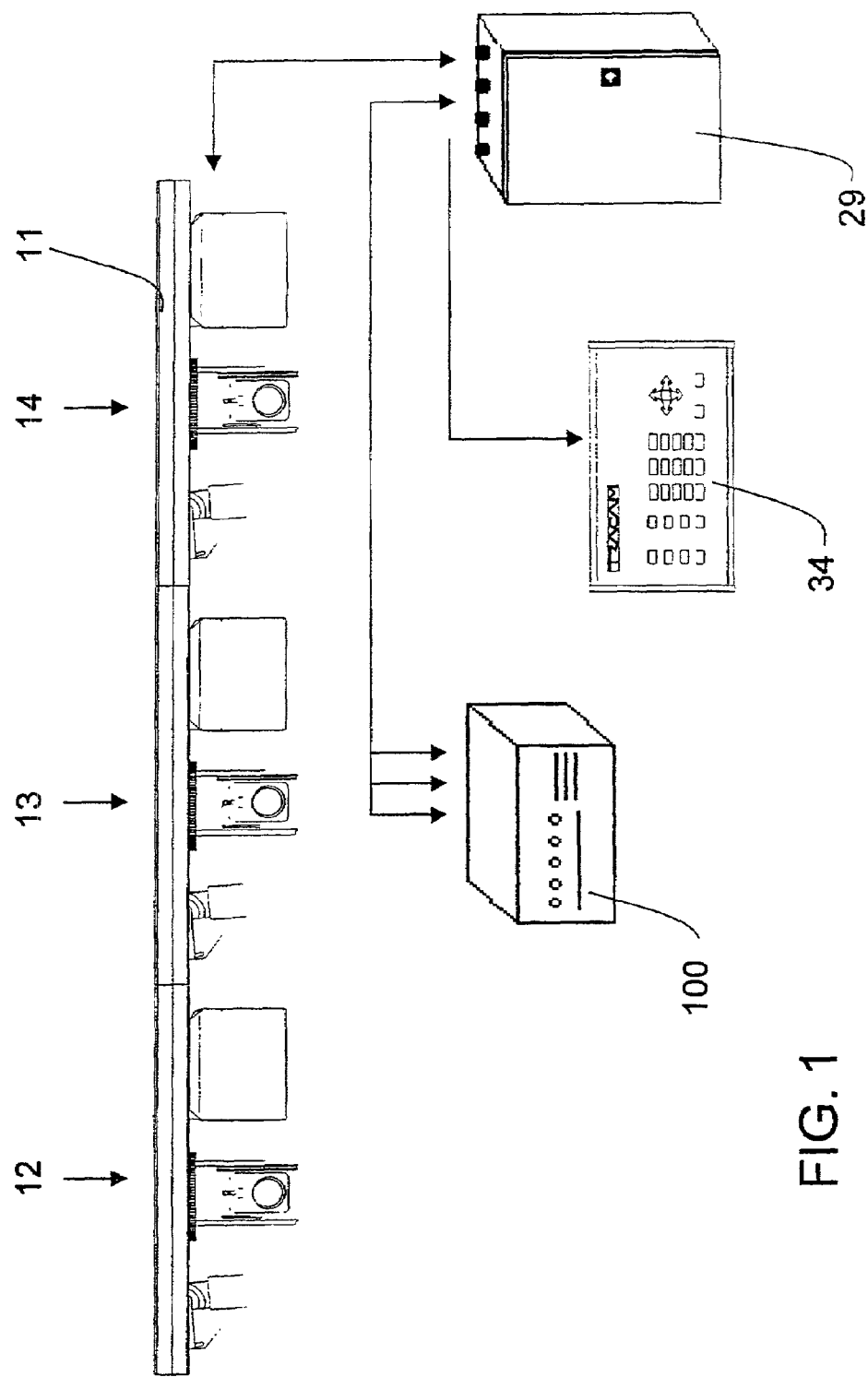
FIG. 1 is a drawing of the general hardware components of a surveillance system.

Referring to the drawings, wherein like numerals designate like or corresponding parts throughout the several views of a surveillance system.

FIG. 1 shows three carriages or Video Transport Units (VTUs) 12, 13, 14 attached to track 11 in communication with an interface translator 29 via conductors associated with track 11. Interface translator 29 links with a video monitoring system 100 and controller 34 which may be at a remote location. Interface translator 29 links control information between controller 34 and each VTU; receives video information from VTUs and provides this information to video monitoring system 100 in a form suitable for viewing; and provides a means for position management of VTUs as part of a collision avoidance means.

Figure 2:
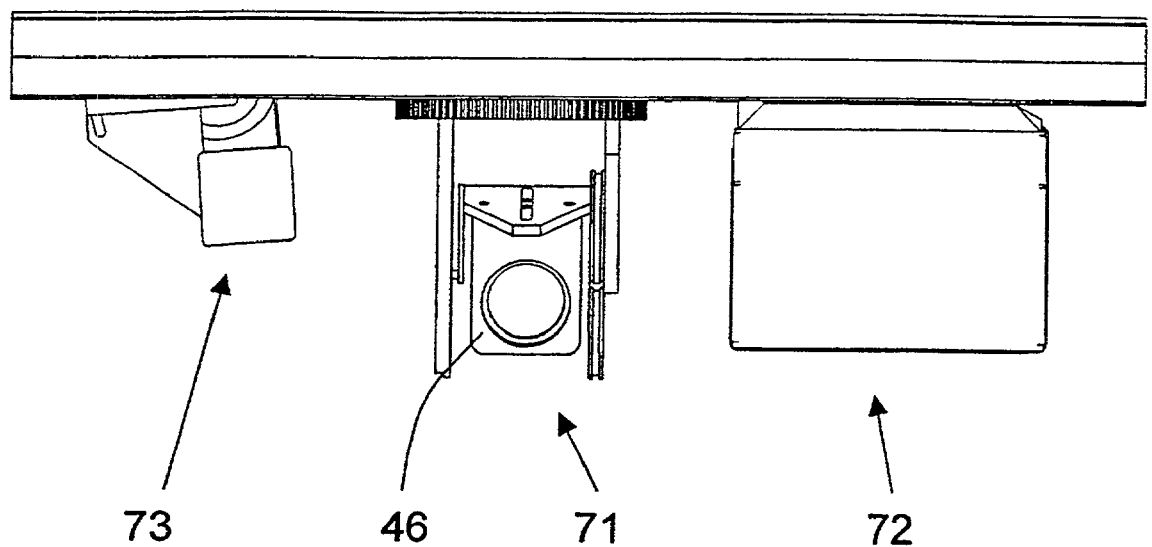
FIG. 2 is a drawing of a carriage or Video Transport Unit (VTU) attached to a track.

FIG. 2 shows a VTU 14 attached to track 11. The VTU includes a driver section 73, a monitoring device section 71 and a microprocessor section 72. Driver section 73 provides a means for moving VTU 14 on track 11. Monitoring device section 71 comprises a mounted video camera 46 which is capable of panning continuously through 360°, tilt 120°, zoom and focus. It will be understood that the video camera is merely one example of a monitoring device which may operate in the visible, infrared or ultraviolet spectrum and which may include audio monitoring. Microprocessor section 72 comprises electronic means for controlling VTU 14, transmitting video information and transmitting and receiving data information to a remote location as shown in FIG. 1.

Figure 3A:
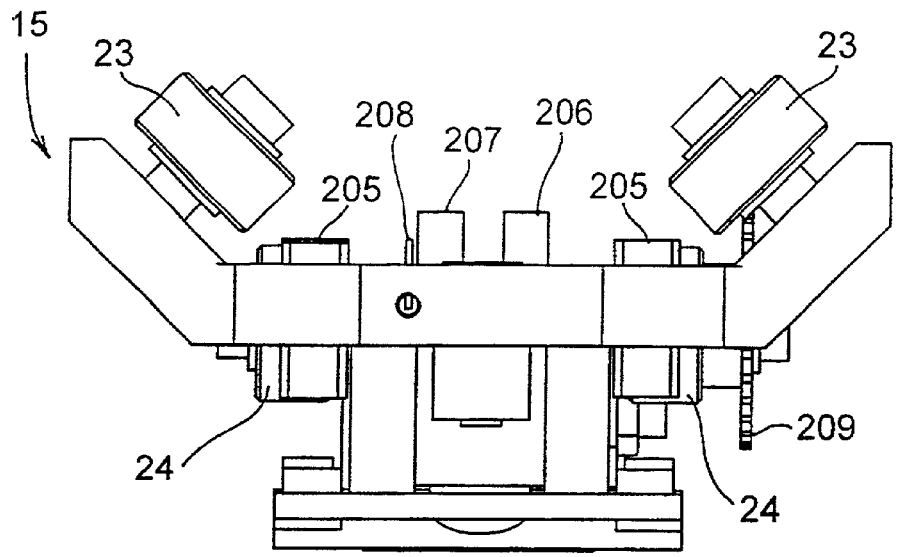
FIG. 3A is an end view drawing of a brush bogie of a VTU comprising brushes for power, data and ground and a Radio Frequency (RF) antenna for transmission of video information.
Figure 3B:
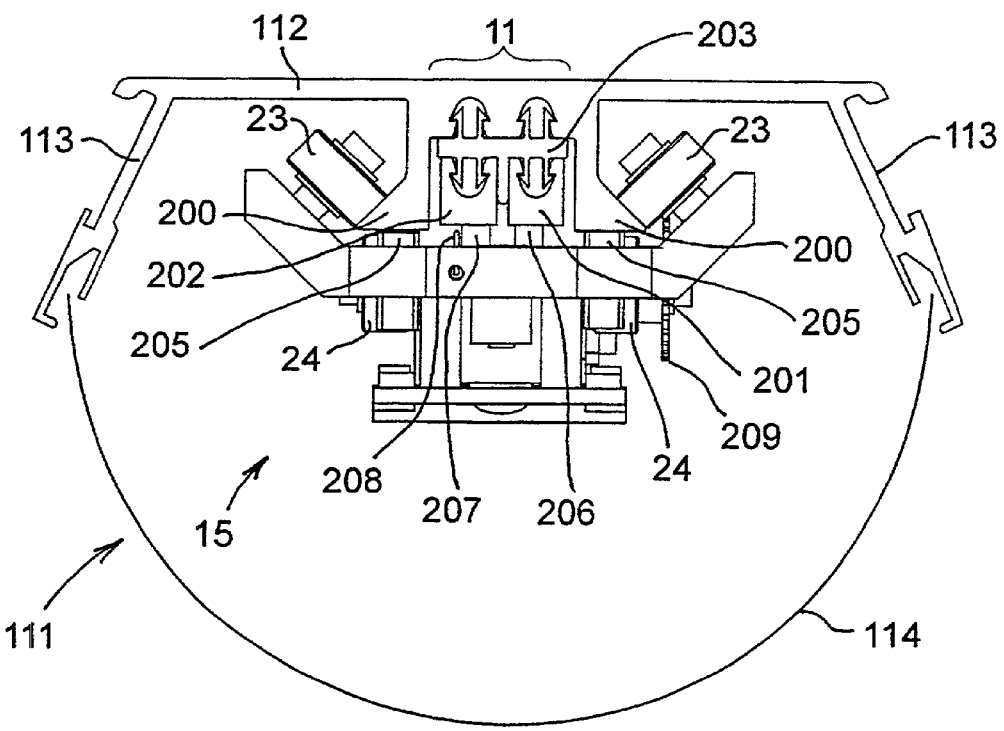
FIG. 3B is an end view of the brush bogie of FIG. 3A attached to a three conductor track assembly.

FIG. 3A shows an end view of a brush bogie 15 in isolation and FIG. 3B shows an end view of the brush bogie 15 of FIG. 3A attached to a track 11 within track assembly 111. Brush bogie 15 electronically links a VTU 14 to track 11. Four wheels 23, composed of plastic or other suitable material, which contact ground conductor 200 at an extended slanted portion enables rolling movement of brush bogie 15 and attaches brush bogie 15 to track 11. A pair of wheels 24 contact ground conductor 200 at a same surface as carbon brushes 205 and provide a force to assure constant and even contact of wheels 23 with extended slanted portions of ground conductor 200. Four spring loaded carbon brushes 205 attached to brush bogie 15 contact ground conductor 200 and provide suitable grounding of VTU 14. A pair of spring loaded carbon brushes 206 transmit power to VTU 14 from power conductor 201. A pair of spring loaded carbon brushes 207 transmit data and control information between microprocessor section 22 and data and video conductor 202. An antenna 208 composed of teflon coated tinned copper or other suitable material transmits video signals from microprocessor section 72 to data and video conductor 202 by RF. An optical encoder 209 comprises a means for measuring rotations of a rotatable wheel for determining speed and distance travelled by VTU 14.

Track assembly 111 comprises a base member 112 with slanting sidewalls 113, a semi-opaque cover 114 which is mountable to slanting side walls 113 and centrally positioned track 11 shown comprising three conductors 200 (ground), 201 (power) and 202 (data and video) and insulator insert 203.

Figure 4A:
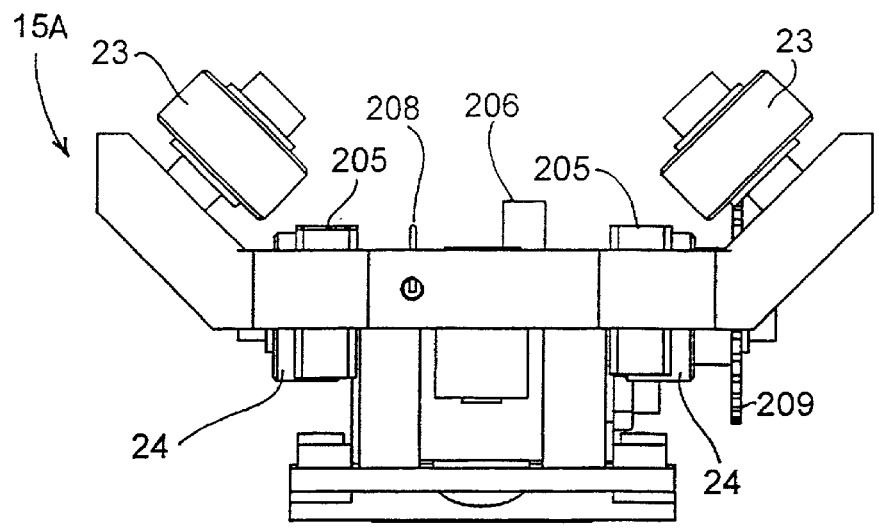
FIG. 4A is an end view drawing of a brush bogie of a VTU comprising brushes for power and ground and an RF antenna for transmission of both data and video information.

FIG. 4A shows an end view of a brush bogie 15A with an RF antenna 208 for transmitting both data and video information to a conductor. Accordingly, carbon brushes for transmitting data signals shown as carbon brushes 207 in FIGS. 3A and 3B are omitted.

Figure 4B:
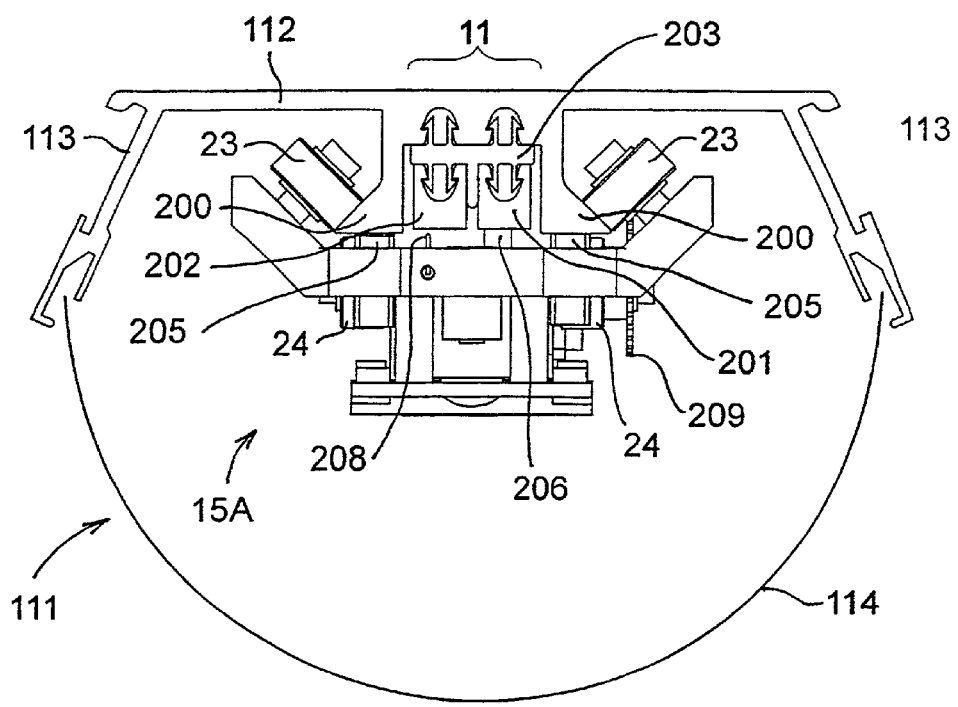
FIG. 4B is an end view of the brush bogie of FIG. 4A attached to a three conductor track assembly.

FIG. 4B shows an end view of the brush bogie 15A of FIG. 4A attached to a three conductor track 11 in a similar manner as in FIG. 3B.

Figure 5:
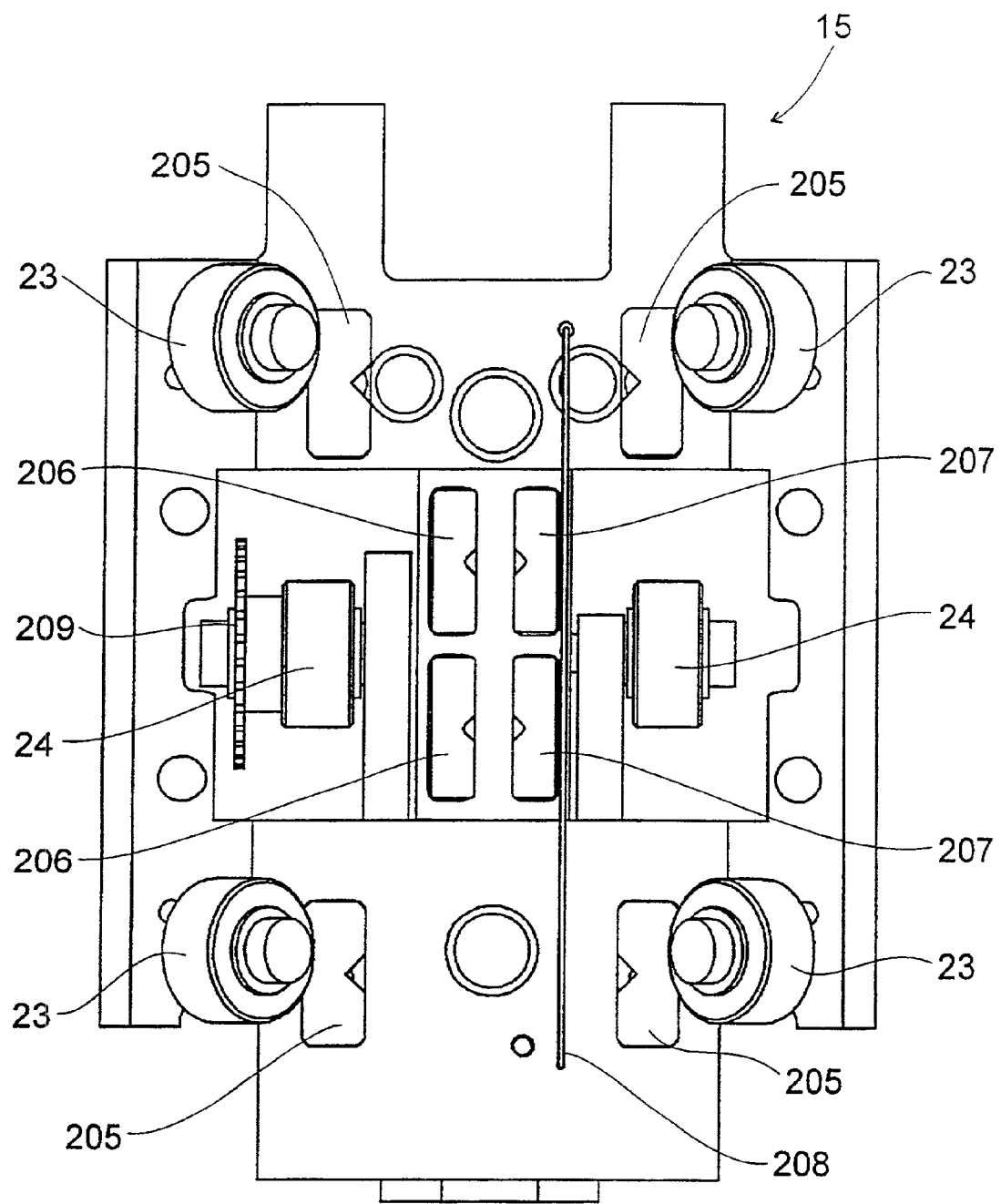
FIG. 5 is a plan bottom view of a brush bogie of a VTU as shown in FIG. 3A.

FIG. 5 is a bottom plan view of brush bogie 15 as shown in FIG. 3A. Shown more clearly are RF antenna 208 for transmitting video information, pair of carbon brushes 206 for transmitting power, pair of carbon brushes 207 for transmitting data signals, four carbon brushes 205 for grounding VTU 14 and optical encoder 209. Also shown more clearly is a pair of wheels 24 and four wheels 23 for attaching VTU 14 to track 11.

Figure 6A:
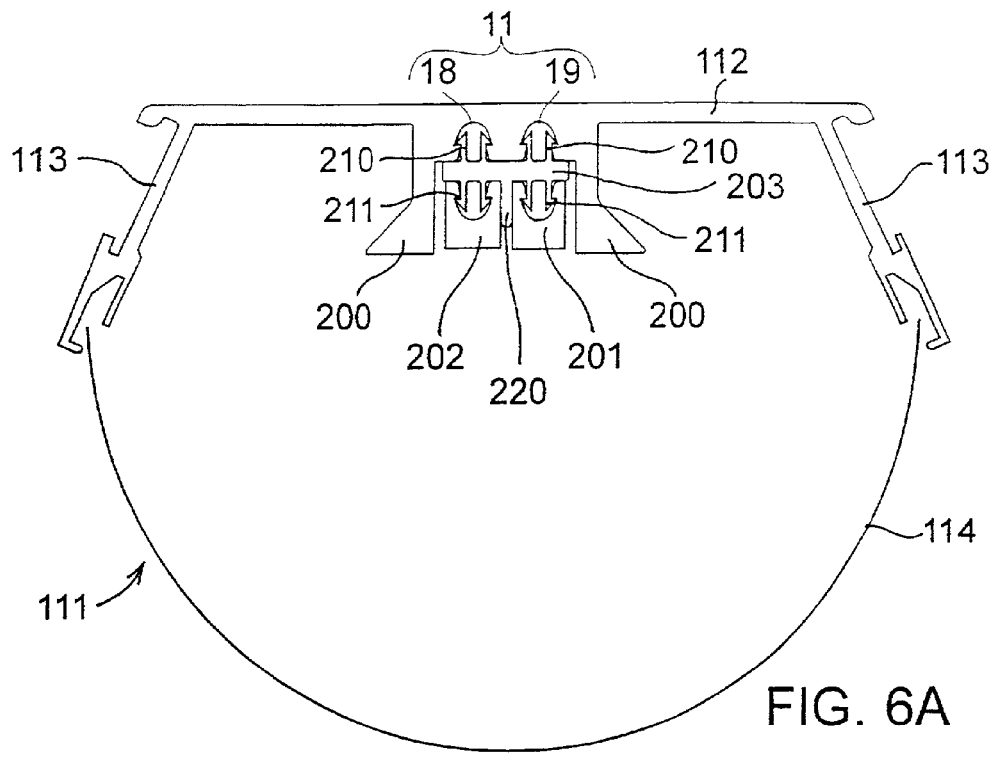
FIG. 6A shows a three conductor track assembly for the video surveillance system.

FIG. 6A shows a track assembly 111 for a three conductor track 11 comprising a base member 112 with slanting side walls 113, a semi-opaque cover 114 which is mountable on to slanting side walls 113 and centrally positioned track 11 comprising conductors 200 (ground), 201 (power) and 202 (data and video) and insulator insert 203. Insulator insert 203 is a T-shaped clip with two pairs of barbs 210 on top and two pairs of barbs 211 on bottom sides respectively of insulation insert 203. Perpendicular wall 220 is centrally located along the bottom of insulation insert 203 separating conductors 201 and 202. The two pairs of barbs 210 engage a central base member of track assembly 111 at recesses 18 and 19. The two pairs of barbs 211 engage conductors 201 and 202 on a bottom side of conductors 201 and 202. When in use, insulator insert 203 insulates and attaches conductors 201 and 202 to the central base member of track assembly 111. Track 11 also comprises two opposed ground conductors 200 which form a cross sectional U-like shape in which conductors 201 and 202 are internally located.

Insulation inserts 203 are positioned at intervals along the central base of track assembly 111 to insulate and attach conductors 201 and 202 to track assembly 111.

Figure 6B:
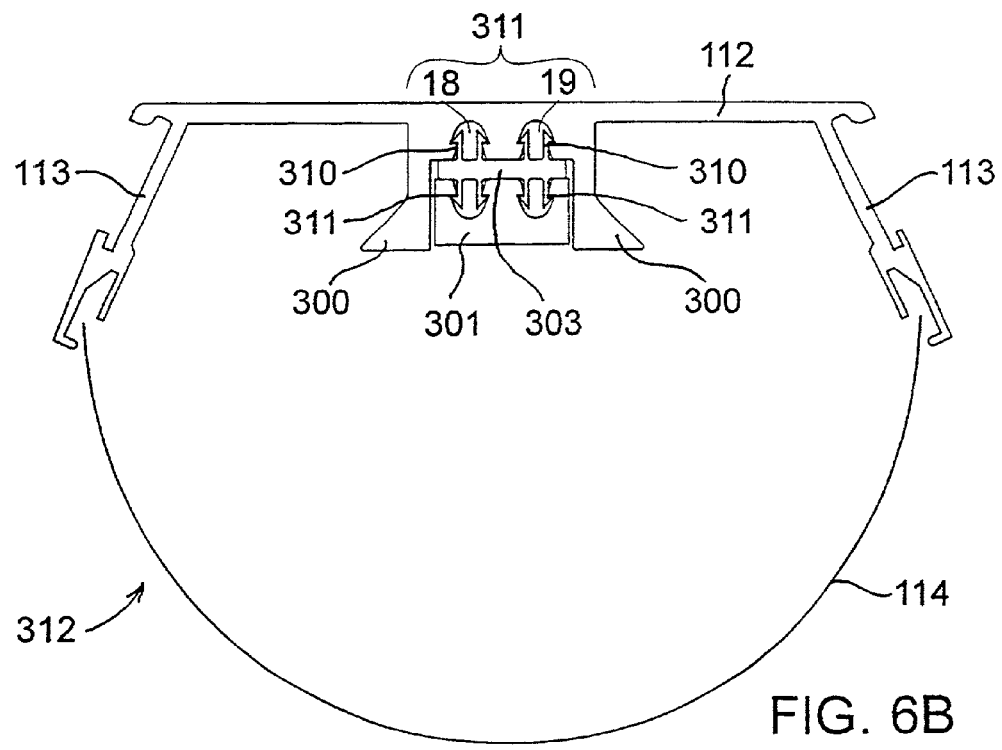
FIG. 6B shows a two conductor track assembly for the video surveillance system.

FIG. 6B show a track assembly 312 which is similar to the track assembly of FIG. 6A; however, track 311 of FIG. 6B comprises only two conductors 300 and 301. Conductor 301 conducts power, video and data information whereas conductor 300 provides grounding. Insulator insert 303 attaches to conductor 301 and central base member of track assembly 311 at raised recess 18 and 19 in a similar manner as in FIG. 6A using barb members on top 310 and bottom 311 of insulator 303.

Figure 7:
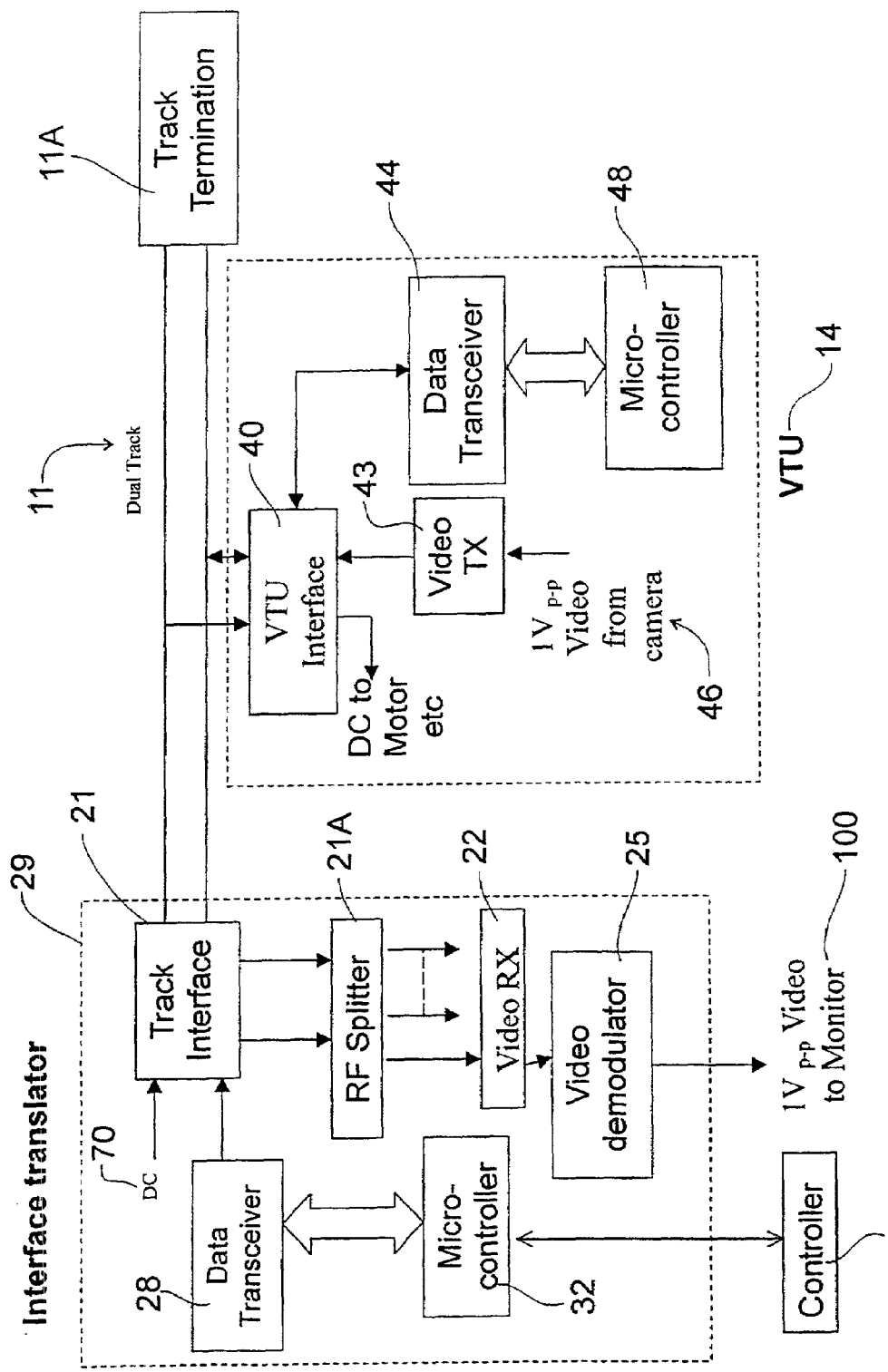
FIG. 7 is a diagram of a general overview of the electrical components of the surveillance system.

FIG. 7 shows a block diagram overview of the surveillance system. Video and data signals are modulated to different frequencies, combined and transmitted along the track 11 shown as a dual track for power and data and video signals, then separated and processed by either a VTU 14 or interface translator 29. The signal path is bi-directional; data and control signals are transmitted in both directions between VTU 14 and interface translator 29. Video signals are transmitted only in one direction, from VTU 14 to interface translator 29. Provisions for up to eight video signals modulated to different frequencies are provided, but it would be appreciated by one skilled in the art that additional video signals could be used.

The VTU 14 receives and transmits signals to track 11 via VTU interface 40, which may be a mixer and splitter. VTU interface 40 provides a means for receiving and transmitting signals from VTU 14 and track 11. Power flows through the VTU interface 40 from track 11 to VTU 14 to power devices such as a driver motor on driver section 73 and camera 46 on monitoring device section 71. Video signals from a camera 46 pass through video transmitter 43 to provide the video signals in a suitable form to be transmitted on to track 11 by VTU interface 40. VTU interface 40 also receives and transmits data or control signals to and from data transceiver 44. Data transceiver 44 provides electrical signals in a suitable form for micro-controller 48. Data transceiver 44 also provides information from micro-controller 48 to VTU interface 40 in a suitable form for transmission on track 11. Micro-controller 48 is a microprocessor controlling the functions of VTU 14 including position management and camera functions.

Figure 9:
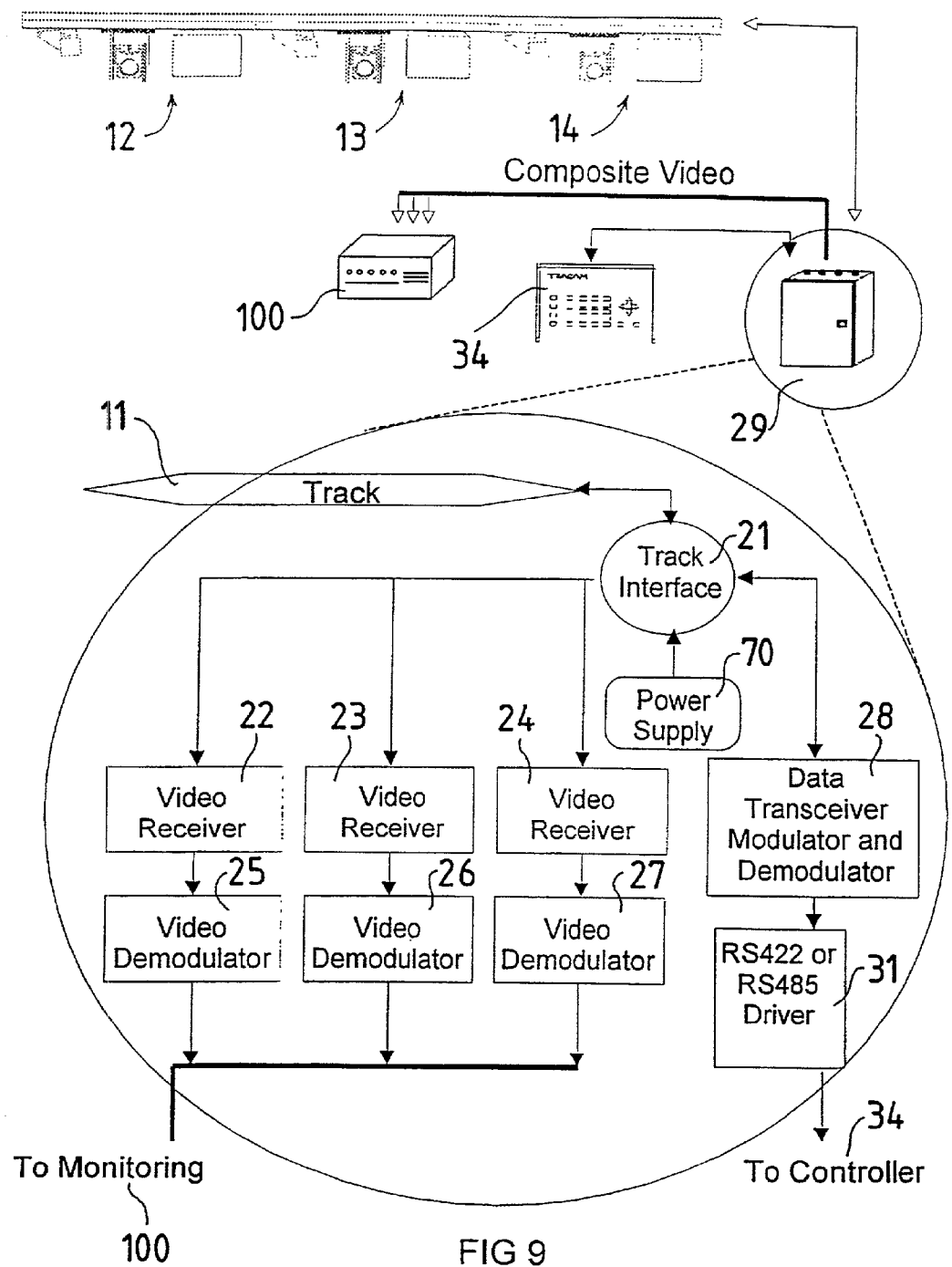
FIG. 9 shows a block diagram of electrical components of an interface translator as in FIG. 7.
Figure 10:
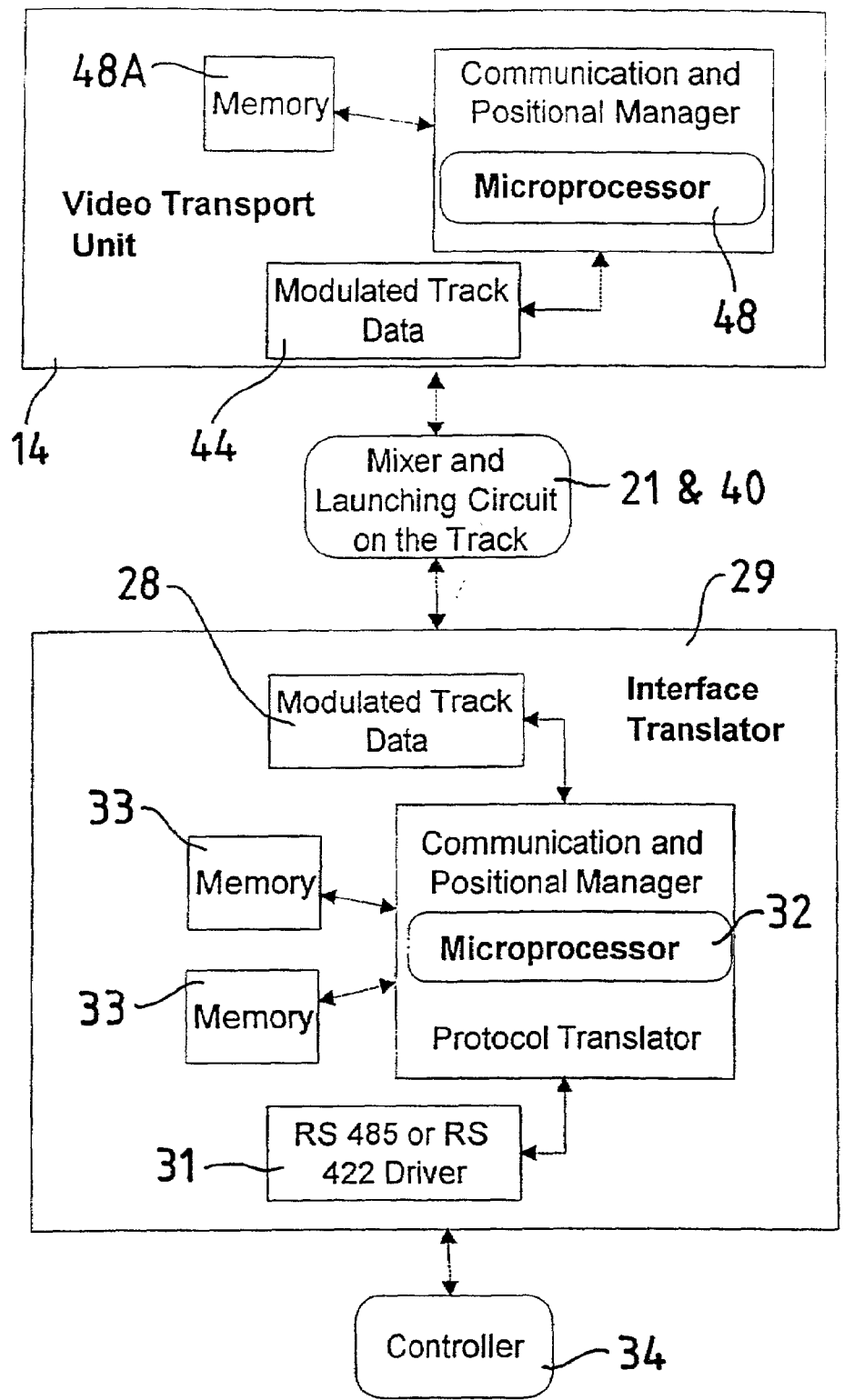
FIG. 10 shows a block diagram of electrical components of data or control signal flow between a controller and VTU.

At a remote control station, a user may control a VTU by inputing commands at controller 34 which sends signals to interface translator 29 which comprises: track interface 21, data transceiver 28, micro-controller 32, RF splitter 21A, video receiver 22 and video demodulator 25 which sends a suitable video signal for viewing at video monitoring station 100. FIGS. 9 and 10 provide additional information relating to interface translator 29 as discussed below. Micro-controller 32 sends signals to data transceiver 28 which communicates with track 11 through track interface 21. Track interface 21 is also linked to RF splitter 21A and DC power supply 70. RF splitter 21A is attached to a video receiver 22 which is further linked to a video demodulator 25 and a monitor 100 for viewing images originating from camera 46.

The characteristic impedance of dual track 11 is approximately 22 ohms. Track 11 has a track terminator 11A at an end opposite to track interface 21 to reduce signal reflections which may cause video picture distortion. VTUs are designed to appear as high impedance to avoid video and data signals from being loaded with multiple VTUs on track 11.

Figure 8:
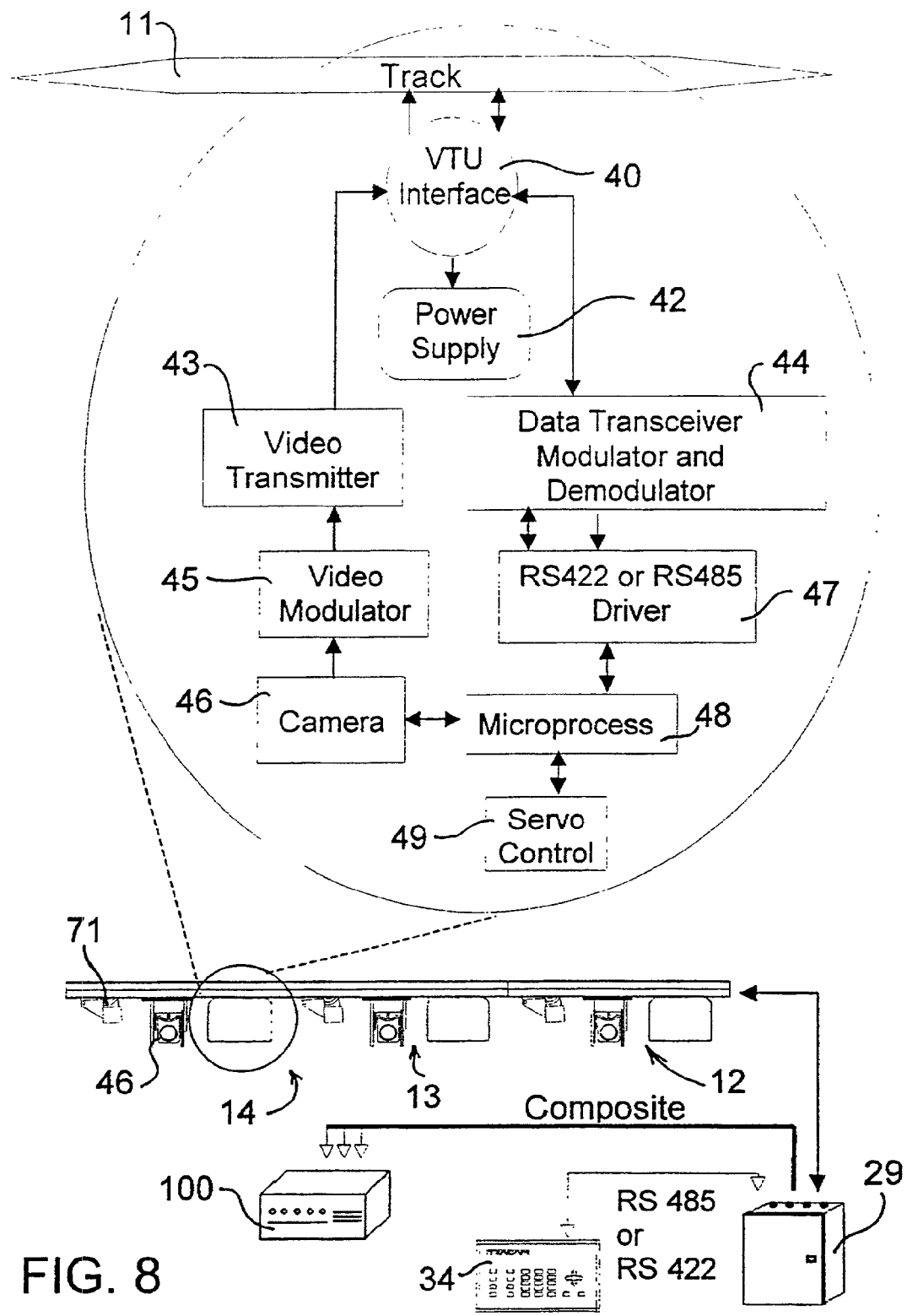
FIG. 8 shows a block diagram of electrical components of a microprocessor and camera sections of a VTU as in FIG. 7.

FIG. 8 shows a block diagram of the power and signal processing schema of the invention. A camera 46, mounted on monitoring device section 71 is controlled by microprocessor 48 for viewing of an area under surveillance. The microprocessor 48 is able to rotate, pivot, zoom and focus the camera 46.

Video signals from the camera 46 are processed by video modulator 45 for transmission by video transmitter 43. The video modulator encodes the video signals for a suitable carrier frequency. As described below, this may be an RF signal for brushless contacts or a lower frequency in embodiments that use brush contacts.

VTU interface 40, which may comprise a filter and mixer, manages the placing of signals on the track 11 and receiving signals from the track 11. Power supply 42 is also transferred from track 11 to the VTU via VTU interface 40.

The microprocessor 48 also controls the movement of the VTU 14 by controlling the servo control 49 on the driver section 70. Control of the VTU may originate from a user at a remote station with a controller 34. As described below, an interface translator 29 transmits control signals on track 11. The control signals are picked up by VTU interface 40 and communicated to data transceiver modulator and demodulator 44. Data transceiver modulator and demodulator 44 is connected to driver 47 which is connected to a microprocessor 48 which controls both the camera 46 and servo control 49.

FIG. 9 shows an interface translator 29 comprising track interface 21 connected directly to track 11. Track interface 21 is connected to video receivers 22, 23, 24 which receive video signals originating from each VTU. Video signals are transmitted at different frequencies for each VTU. The video signals are demodulated by a respective demodulator 25, 26, 27 which is hard wired to monitoring system 100 which includes a video display whereby images from each camera 46 of each VTU can be displayed.

A power supply 70 is connected to track interface 21 and may be a stand alone battery unit or connected to a remote power source through conductor 201.

Track interface 21 is also connected through a data transceiver modulator and demodulator 28 and driver 31 to controller 34 for controlling a VTU from a remote location.

FIG. 10 shows data and control signal flow between controller 34 to VTU 14 via interface translator 29. Data and control information flows in both directions between controller 34 and VTU 14. Interface translator 29 includes a driver 31 connected to a microprocessor 32. The microprocessor 32 includes a communication and positional manager, protocol translator and memory 33. Data transceiver 28 shown as "modulated track data" modulates data and sends the modulated data to track interface 21 or receives signals from track interface 21 and demodulates the signals. Signals are transmitted to and received from track 11 by VTU interface 40, shown as a mixer and launching circuit. Signals received from track 11 by VTU interface 40 are demodulated by data transceiver 44 shown as "modulated track data". Signal originating from VTU 14 are modulated by data transceiver 44 before placing onto track 11 by VTU interface 40. Data transceiver 44 is attached to microprocessor 48 which can store data information in memory 48A.

Figure 11:
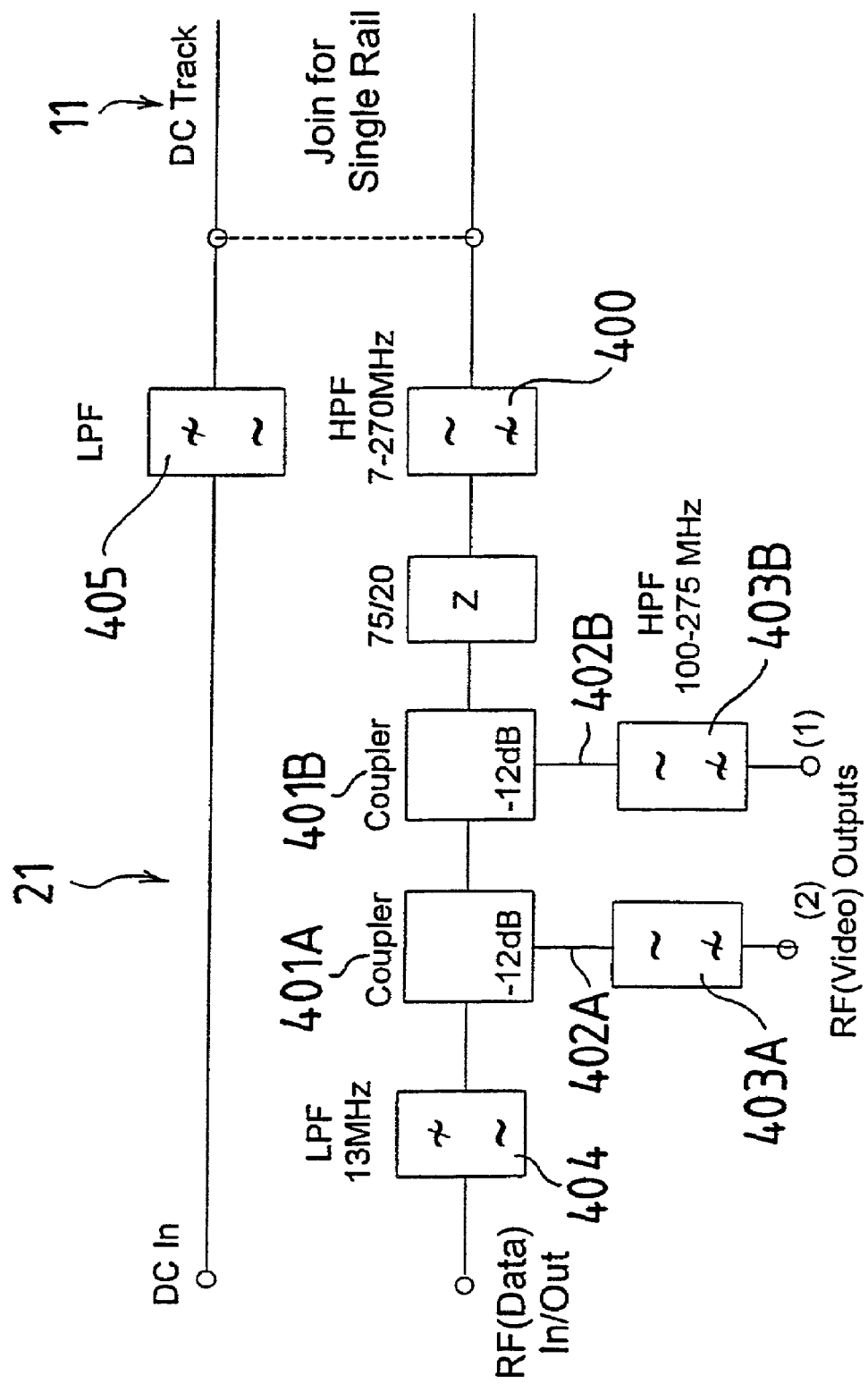
FIG. 11 is an electrical diagram of the track interface of FIG. 7.

FIG. 11 is an electronic diagram of a track interface 21 as shown in FIG. 7. Track 11 is shown as a dual track with DC power and RF signals on separate conductors. At the interface translator 29, signals from the track 11 are band pass filtered 400 between 7 MHz and 270 MHz to remove as much brush, motor and other interference as possible. The track impedance is transformed back to 75 ohms and video and data signals are separated using directional couplers 401A and 401B. Two video paths 402A and 402B are provided for multiple VTU applications. These two video paths are split into four thus providing eight video channels. The video channels are band pass filtered 403A and 403B between 100 MHz and 275 MHz to cover the eight video channels before passing to a video receiver. The data signal is low pass filtered 404 to 13 MHz to remove video signals before passing to a data transmitter and receiver. A low pass filter 405 filters data and video signals on DC track.

Figure 12:
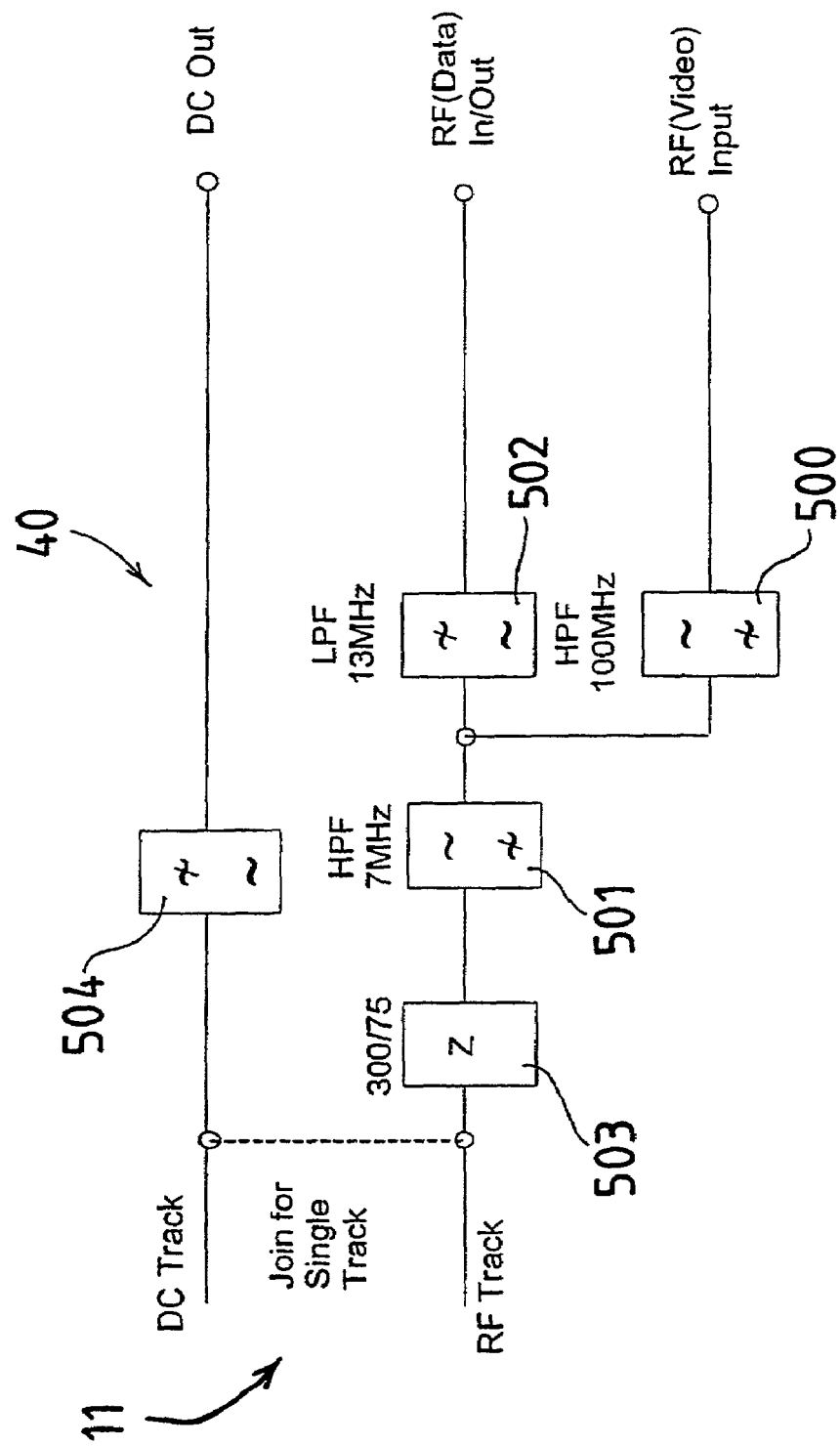
FIG. 12 is an electrical diagram of the VTU interface of FIG. 7.

FIG. 12 is an electronic diagram of a VTU interface 40 as shown in FIG. 7. The output impedance of the video transmitter is 75 ohms. The video signal passes through a high pass filter 500 to an antenna loop which is terminated in 75 ohms. The antenna loop directionally launches a signal onto the track 11, sending most of the signal towards the interface translator 29. The data transmitter modulates data to 10.7 MHz. The transmitted data passes though a band pass filter between 7 and 13 MHz, shown as filters 501 and 502, to remove the video signals and other interference from track 11. The signal passes through a matching transformer 503 which raises the impedance to approximately 320 ohms. This reduces the loading of multiple VTUs on track 11.

Track 11 is shown as a dual track with three conductors for DC power, ground and RF signals on separate conductors. The DC track has a low pass filter 504.

Collision Avoidance Means

In one form of the invention, track 11 has multiple VTUs 12, 13, 14 which are movable along overlapping locations of track 11.

Accordingly, it is important to prevent collisions between adjacent VTUs.

A positional management system provides a means to prevent collisions between adjacent VTUs. Two means of collision avoidance are provided, a first main or master level controlled by an interface translator 29 and a second means managed by each VTU.

FIGS. 7, 9 and 10 show interface translator 29 comprising a microprocessor 32 which provides an interface between master controller 34 and data transceiver 28. Hardware and software within interface translator 29 control movement of each VTU 12, 13, 14. Interface translator 29 is located in a Power Supply Interface enclosure mounted at the start of each track 11.

The interface translator 29 interprets and processes commands received from master controller 34 and forwards the commands to an appropriate VTU 12, 13, 14. Interface translator 29 manages positional and movement commands of each VTU and allocates priority to an appropriate VTU in response to an alarm activated preset or other command.

Presets are a mechanism where positional information about a camera view is automatically stored so a VTU can return to that position later. Presets can be used with alarms to view particular areas where activity has set off the alarm.

The interface translator 29 monitoring the system decides which VTU 12, 13, 14 is closest to the preset position requested and enables the shortest response time and enures movement of a VTU is unimpeded by other VTUs on track 11.

Interface translator 29 also functions as a main positional manager for a track 11 to which it is attached. Positional information is provided from data sent by each VTU 12, 13, 14 on track 11 and this information is mapped in memory 33. Each VTU 12, 13, 14 comprises an optical encoder 209 (shown in FIG. 3) which measures distance by wheel rotations as the VTU moves along track 11. Position indicators or registration marks, such as bar codes, along track 11 and markings on the measurement wheel are monitored by a sensor which transmits signals to microprocessor 48 which is then able to store data on the position of each VTU 12, 13, 14. As VTU 12, 13, 14 moves along track 11, memory in microprocessor 48 is updated so that microprocessor 48 is continually aware of each VTU 12, 13, 14 location on track 11. Interface translator 29 acts as an arbitrator if there is conflict of position requests and ensures that adjacent VTUs maintain a minimal distance. A suitable minimal distance is 2.4 meters or 8 feet which forms a buffer zone between any adjacent VTUs.

Referring to FIGS. 7, 8 and 10, while microprocessor 48 records the position of its own VTU 14, it is also transmitting data on its location through driver 47, data transceiver 44 and VTU interface 41 along a common communication conductor 202 of track 11 where interface translator 29 is able to receive this positional data through track interface 21 and data transceiver 28 for processing by its microprocessor 32.

Because each VTU is effectively identical, they are each able to store data on the location of their own VTU along track 11 and are equally able to transmit this data on the common communication conductor 202 of track 11 where this data can be received by the interface translator 29. During installation, VTUs are configured with appropriate positional information of other VTUs. This information is continually updated during VTU movement on track 11. An active VTU broadcasts its changing location which allows other VTUs to update a last known location of adjacent VTUs. The active VTU will immediately stop if conflict arises with an adjacent VTU location.

Transmission of data from each VTU occurs on a common frequency. Accordingly, because there is only one communication line 202 which is used by all VTUs, interface translator 29 operates to ensure that only one VTU transmits data at any one time.

Position management software of interface translator 29 sequentially polls each VTU. The polling process occurs continually even if there is no movement or activity of any one VTU 12, 13, 14 on track 11. Each VTU 12, 13, 14 has a unique address. Interface translator 29 addresses each VTU 12, 13, 14 in turn and requests the positional information and status of each VTU. The VTU 12, 13, 14 which recognises this unique address is the only VTU which responds to a command from interface translator 29. The response from the commanded VTU 12, 13, 14 contains its current positional information and status. The rate at which each VTU and its unique address is polled is dependent upon the number of VTUs on track 11. This polling rate is typically one to two per second. If the information translator 29 detects an active status on any VTU during the normal polling routine, it immediately increase the polling rate to the active VTU. This process is called refresh. The rate at which refresh occurs is directly related to the number of active or moving VTUs on track 11 at any one time. A typical refresh rate is 6 to 10 per second.

Information which is returned by a particular VTU 12, 13, 14 during refresh allows the interface translator 29 to update the last known location of the active VTU at a more frequent rate.

Figure 13:
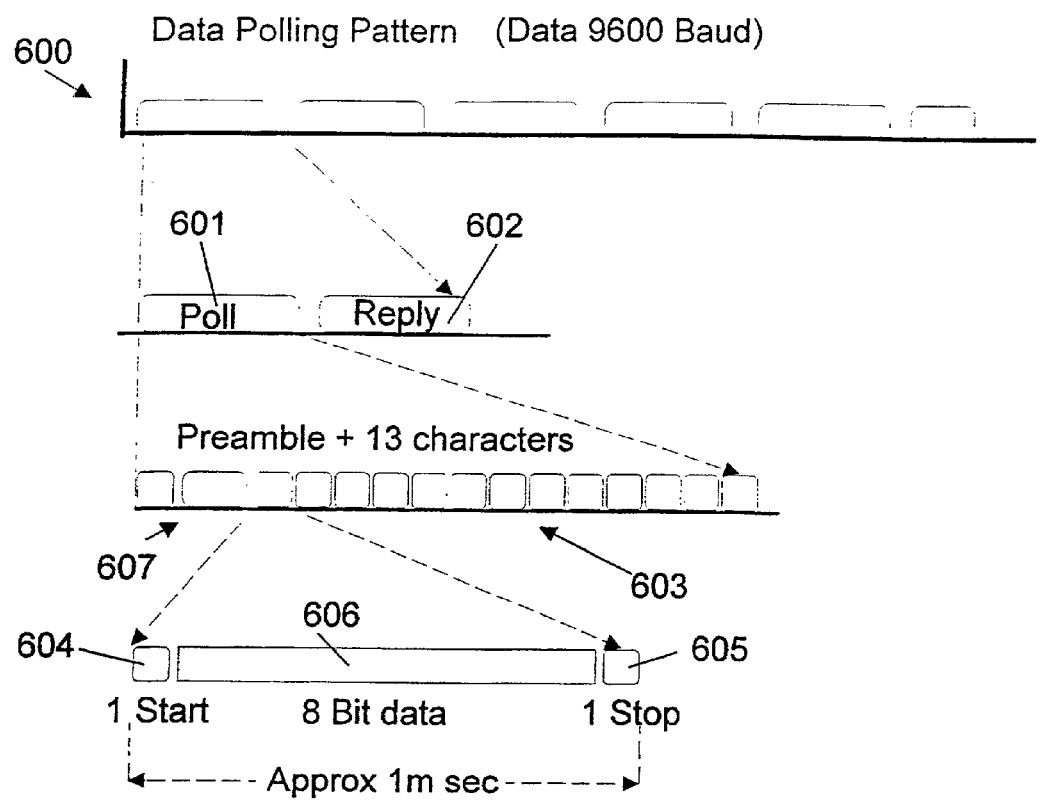
FIG. 13 shows a diagram of a data polling pattern.

FIG. 13 shows a typical data polling pattern 600 comprising poll 601 and reply data 602. The poll data 601 comprises a preamble 607 followed by 13 characters 603 of information. Each character comprises a start 604, stop 605 and eight bits of data 606. Time from start to stop is approximately 1.0 msec.

As shown in FIGS. 7 to 10, when it is desired to monitor a particular location, master controller 34 transmits command signals to the interface translator 29. The interface translator 29 has a record of the location of each VTU stored in its memory 33. Consequently when one particular area must be monitored its selects the closest VTU to move to a location on track 11 where monitoring can occur. Accordingly, as part of the process of commanding one of the VTUs to move, it must first allocate priority to each VTU 12, 13, 14 according to its distance along track 11 from the final destination along track 11 where monitoring is to occur. If there is any positional conflict between VTUs because they are both within a similar distance from the desired destination, the interface translator 29 ensures that adjacent VTUs do not encroach on a buffer zone which has been preselected and stored in memory. It follows therefore that if two VTUs move to a desired destination and cannot reach the final destination because they both would enter the buffer zone between them, the VTU with the higher priority would be instructed to move to the desired destination while the adjacent VTU with the lower priority would move away from the desired destination to ensure the buffer zone is maintained.

In addition to the above, each VTU and its microprocessor 48 stores data in memory 48A, including the address on the position of each other VTUs 12, 13, 14 on track 11. Microprocessor 48 is also able to receive data transmitted by other VTUs 12, 13, 14 along the common communication conductor 202 of track 11. Because each VTU 12, 13, 14 is aware of the location of other VTUs on track 11 an active VTU 12, 13, 14 will immediately stop if the positional data it has stored on adjacent VTUs indicates that a conflict has arisen because the moving VTU 12, 13, 14 has entered a buffer zone. Accordingly, if the moving VTU finds that it is within a buffer zone of an adjacent VTU it immediately stops. The interface translator 29 then is able to issue commands to the conflicting VTUs 12, 13, 14 so that the VTU 12, 13, 14 allocated the highest priority can move to the desired destination while the other VTU 12, 13, 14 moves far enough away so that the buffer zone is maintained.

When a VTU approaches a buffer zone between itself and a second VTU, information and commands may be transferred from one VTU to a second VTU as part of a handover or swapping procedure. Handover procedures are controlled by interface translator 29.

As part of the collision avoidance system, position indicators provided as bar codes are located along the track at intervals to provide reference points for correcting any discrepancies which may occur due to loss of power or optical encoder 209 inaccuracies. The bar codes may provide an absolute measurement of distance along track 11. These bar codes are sensed by bar code detectors located on each VTU 12, 13, 14. Initially, each VTU is moved along track 11 at a slow speed to set bar code locations into memory. Initial referencing of bar code locations at slow speed assures more accurate position identification as wheels 23 and 24 of the VTUs are less likely to slip when compared to the higher speed of movement which is typically 3.3 meters/second to 4.5 meters/second, although speed of movement may be faster or slower than this range. The bar code detectors and the optical encoder 209 together provide positional data to the microprocessor 48 of its VTU 12, 13, 14.

With the collision avoidance system described above, a fail safe positional management system is achieved for each of VTUs 12, 13, 14, whereby the interface translator 29 is able to manage position and movement commands from the master controller 34 and allocate priority to the appropriate VTU 12, 13, 14 to satisfy such requests as alarm activated presets and tours. The interface translator 29 is able to act as an arbitrator if there is a conflict of position requests received from the master controller 34. The interface translator 29 ensures that adjacent VTUs 12, 13, 14 do not encroach on the buffer zone. If for some reason this policing action by interface translator 29 is interrupted there is still a second level of collision avoidance provided by VTUs 12, 13, 14 monitoring the position of other VTUs 12, 13, 14 on track 11.

Positional data on each VTU 12, 13, 14 is mapped into separate memory locations allocated with the specific address of a respective VTU 12, 13, 14. A similar mapping process occurs in storage locations of the microprocessor 48 of each of the VTUs 12, 13, 14. Each of the microprocessors 48 of the VTUs 12, 13, 14 also stores data on the buffer zone with the result that each microprocessor 48 can determine when its VTU 12, 13, 14 is in conflict with an adjacent VTU 12, 13, 14. Unlike the interface translator 29, however, microprocessor 48 of each VTU 12, 13, 14 does not have the ability to solve a conflict with an adjacent VTU 12, 13, 14.

Figure 14:
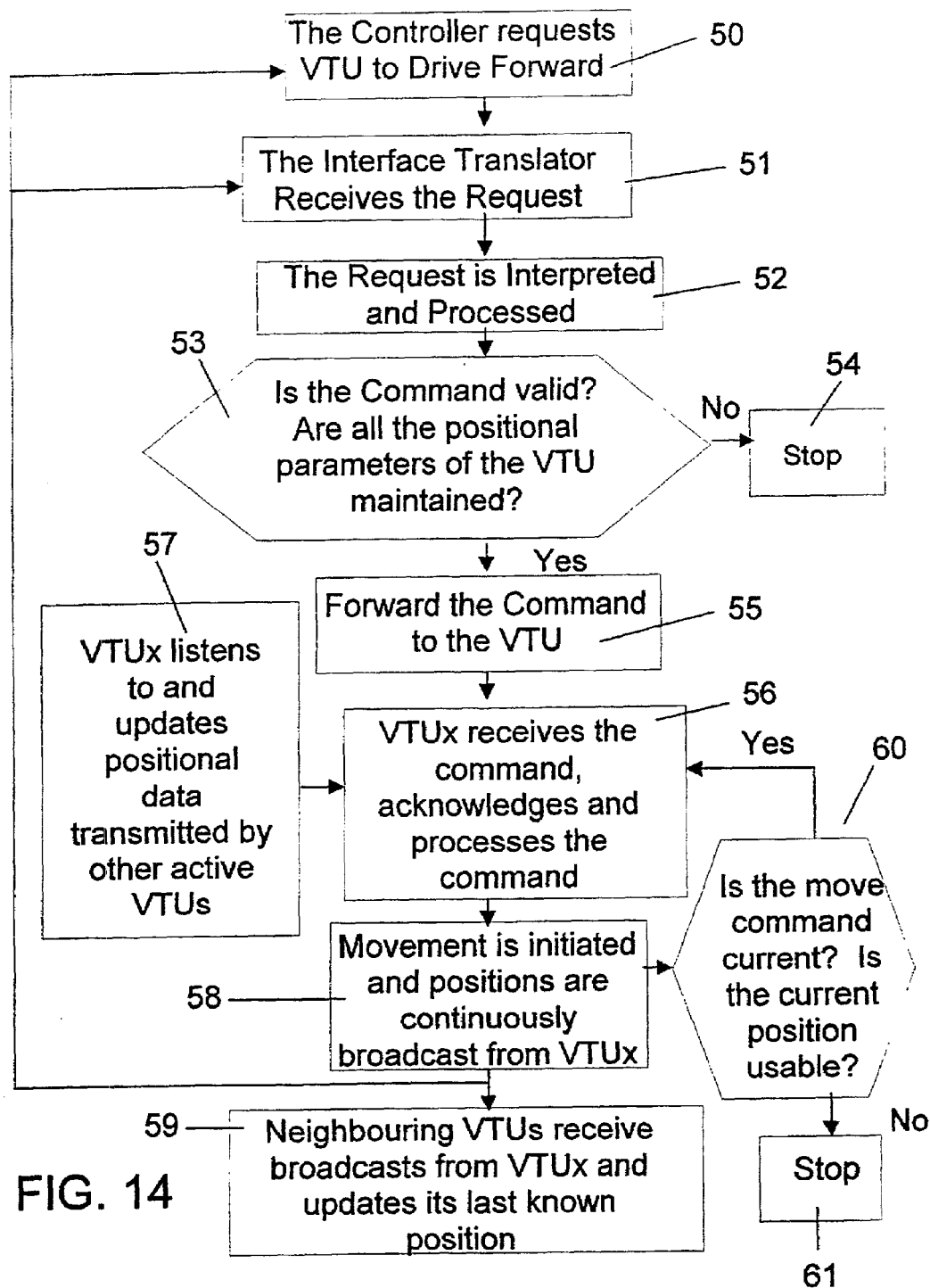
FIG. 14 shows a flow diagram of a controller request.

FIG. 14 shows a typical flow diagram of a controller request received from the master controller 34. Master controller 34 requests a VTU 12, 13, 14 to move forward by sending a command signal 50 to interface translator 29 which receives the request 51. The interface translator 29 then interprets and processes the request 52. The interface translator 29 then determines whether the command is valid 53. If the command is not valid then further action is stopped 54.

If all the position parameters of each VTU is maintained, the interface translator 29 transmits a forward command 55 to one of the VTUs.

A VTU receives a forward command, acknowledges and processes the command 56 from the interface translator 29 and is also constantly listening for updated positional data broadcast 57 transmitted from other VTUs on track 11.

Movement of the VTU is then initiated and positional updates are continuously broadcast 58 from the moving VTU to the common communication conductor 202 of track 11.

Adjacent VTUs receive the broadcast 59 from the moving VTUs and thus update their own records to maintain the most recent data on the position of each VTU on track 11.

The microprocessor 48 of the moving VTUs constantly monitor whether the command from the information translator 29 is current 60.

If the command is current, the VTU repeats the step 56. If the command is not current then the VTU stops 61.

The surveillance system described above provides cameras 46 of a VTU 12, 13, 14 capable of panning continuously through 360°, tilt 240°, zoom and focus. VTU 12, 13, 14 provides linear movement for the camera 21 along track 11 and continuous monitoring of multiple areas within a monitored zone is possible using the unique collision avoidance system described above. A wireless radio frequency antenna 208 is capable of transmitting video and/or data information to a conductor extending along track 11. The above surveillance system provides a means to view multiple areas simultaneously.

It is understood that the invention described in detail herein is susceptible to modification and variation, such that embodiments other than those described herein are contemplated which nevertheless falls within the broad spirt and scope of the invention.

The invention claimed is:

1. A surveillance system comprising:
   an electrical conducting track;
   two or more carriages movable on said track;
   a driving means mounted on each said carriage for moving each said carriage to different locations along said track;
   a power supply providing power to each said carriage;
   at least one monitoring device mounted on each said carriage providing an output signal for a monitored location;
   a modulation means receiving said output signal;
   a transmission means for transmitting modulated output signals on said track;
   a means for receiving and demodulating said transmitted modulated output signals;
   a viewing means to view said demodulated output signal at a remote location; and
   a control means for controlling movement of each said carriage on said track, said control means including means for avoiding collisions between said carriages.

2. The system of claim 1 wherein said track comprises three conductors;
   one conductor for transferring power, a second conductor for transferring video and control signals and a third conductor as ground conductor.

3. A system of claim 1 wherein said carriages transmit output video signals at a predetermined frequency which frequency is different from the predetermined frequency of other carriages.

4. A system of claim 1 wherein said carriages receive and transmit data and control signals at a predetermined frequency which is the same frequency for each said carriage.

5. A system of claim 1 wherein said transmission means is an antenna.

6. A system of claim 5 wherein said antenna transmits data and/or video information by radio frequency.

7. The system of claim 1 wherein said monitoring device operates in the visible, infrared, or ultraviolet spectrum.

8. The system of claim 1 wherein said monitoring device is a video camera.

9. The system of claim 1 wherein said monitoring device operates in the audio range.

10. The system of claim 1 wherein said means for avoiding collision comprises:
    a location means to determine a location of each said carriage on said track;
    a transmission means associated with each said carriage for transmitting said carriage position;
    a receiving means for receiving and monitoring said positions of each carriage; and
    a means for controlling said position of each said carriage to avoid collision of any said carriages.

11. The system of claim 10 further comprising:
means at a remote location for receiving and storing said positions of each carriage;
means for tracking positions of each said carriage; and
means for controlling movement of said carriages to avoid collision.

12. The system of claim 10 further comprising:
means on each carriage for receiving and storing a position of each adjacent carriage;
means on each said carriage for tracking positions of each said adjacent carriage; and
means for controlling movement of said carriages to avoid collision.

13. The system of claim 10 wherein said location means comprises a position sensor on said carriage.

14. The system of claim 13 wherein said position sensor comprises a means for sensing distance travelled by said carriage over a predetermined time period and a means associated with each carriage for calculating a location of said carriage.

15. A system of claim 13 wherein said position sensor comprises a rotatable wheel, whereby rotation of the wheel represents the distance travelled by the carriage.

16. The system of claim 13 wherein said location means further comprises registration marks associated with said tracks for correcting said location.

17. The system of claim 1 further comprising means for preventing any one carriage located on said track from colliding with an adjacent carriage located on said track including an interface translator which is adapted to receive position data from said carriages and store the position of each carriage based on the position data received from said carriages.

18. The system of claim 17 further comprising a carriage monitor means which correlates data received from a position sensor on each said carriage and registration marks along said track to store a position of each carriage at a particular instant of time.

19. The system of claim 17 wherein said interface translator comprises a data processing means which comprises position management software for storing data relating to the position of each carriage on said track and controls movement of each carriage whereby collisions between adjacent carriages are avoided.

20. The system of claim 17 wherein said interface translator provides a means for transferring control information from one carriage to an adjacent carriage.

21. The system of claim 1 further comprising position management software that maintains a minimum distance between adjacent carriages.

22. The system of claim 21 wherein said position management software provides a means for allocating a priority value to each carriage at a particular time, whereby a carriage allocated a higher priority is commanded by said position management software to move to a predetermined location on said track when said interface translator receives a command signal from a master controller.

23. The system of claim 1 wherein said control means comprises a master controller which is connected electrically to an interface translator; said interface translator including a microprocessor controlled by position management software;
memory storage means for recording position of each carriage and a minimum distance permitted between adjacent carriages; and a track receiver and transmitter means for communicating data between the master controller and the microprocessor wherein said position management system controls carriages to maintain said minimum distance.

24. The system of claim 23 wherein said position management software comprises a polling means for polling each carriage at a predetermined rate to monitor the location of each carriage and an interface translator with means for changing said polling rate of carriages depending upon whether a carriage is moving or stationary or according to the activity of one or more carriages.

25. The system of claim 1 wherein each carriage includes data processing means for recording and storing data relating to a location of said carriage along said track and for transmitting data relating to said carriage's position along said track to an interface translator.

26. The system of claim 25 wherein said data processing means is capable of receiving and storing data relating to the position of each adjacent carriage from said interface translator and/or each adjacent carriage.

27. A collision avoidance means for a surveillance system comprising two or more movable carriages on a single track, said collision avoidance means comprising:
means on each carriage for determining a position of said carriage;
means for transmitting said position;
means associated with each said carriage for storing said position and receiving and storing a position for one or more adjacent carriages;
means for controlling movement of said carriage to avoid moving said carriage to a position recorded as the position of the said adjacent carriage.

28. The collision avoidance means of claim 27 wherein said means for determining a position is a position sensor comprising a means for sensing distance travelled by said carriage over a predetermined time period and a means associated with each carriage for calculating a location of said carriage.

29. The collision avoidance means of claim 27 wherein said means for controlling movement prevents said carriage from moving within a predetermined distance of said position recorded as the position of the said adjacent carriage.

30. A track assembly for a system of claim 1 comprising at least one conductor adapted to support a carriage and an insulative insert supporting said track.

31. The track assembly of claim 30 wherein said insulative insert for said track assembly comprises:
a top portion with at least one upstanding barb portion adapted to engage a recess of an insert receiving portion of a conductor, whereby removal of said insert is prevented by said barb portion engaging said respective recesses; and
a bottom portion comprising at least one upstanding barb portion adapted to engage a recess of an insert receiving portion of a track, whereby removal of said insert is prevented by said barb portion engaging said respective recesses.

32. The track assembly of claim 30 comprising two signal conductors and a ground conductor wherein said insulating insert comprises an additional insulating member centrally located perpendicular to said top portion of said insert positioned between said two signal conductors.

33. A surveillance method including the steps of:
locating two or more carriages on a track;
mounting at least one monitoring device on each said carriage;
providing power to power movement of each said carriage on said track;

transmitting output signals from said monitoring device to a remote location; and controlling movement of said carriages on said track to avoid collisions between said carriages.

34. The surveillance method of claim 33 wherein said output signals are image signals.

35. The surveillance method of claim 33 wherein said output signals are image and audio signals.

36. The surveillance method of claim 33 further including the steps of:

recording a position of each said carriage on said track.

37. The surveillance method of claim 33 further including the steps of:

reading registration marks associated with said tracks;

calculating a position of each carriage relative to said registration marks;

transmitting said position of each carriage and receiving said positions of each carriage; and controlling movement of each said carriage to avoid collision of any said carriages.

38. A surveillance system comprising:

an electrical conducting track;

two or more carriages movable on said track;

a driver section mounted on each said carriage for moving each said carriage to different locations along said track;

a power supply providing power to each said carriage;

at least one monitoring device mounted on each said carriage providing an output signal for a monitored location;

a data transceiver for receiving said output signal and for transmitting modulated output signals on said track;

a monitoring system for viewing demodulated output signals at a remote location; and a positional management system for controlling movement of each said carriage on said track and for avoiding collisions between said carriages.

* * * * *